United States Patent [19]

Saeed

[11] Patent Number: 4,553,057

[45] Date of Patent: Nov. 12, 1985

[54] CARBON BRUSH WITH PIN FOR LIMITING MOVEMENT

[75] Inventor: Abdul Saeed, Hünstetten, Fed. Rep. of Germany

[73] Assignee: Black & Decker Inc., Newark, Del.

[21] Appl. No.: 651,053

[22] Filed: Sep. 14, 1984

[30] Foreign Application Priority Data

Oct. 12, 1983 [DE] Fed. Rep. of Germany ....... 3337125

[51] Int. Cl.[4] .............................................. H02K 13/00

[52] U.S. Cl. .................................... 310/242; 310/245; 310/249

[58] Field of Search ............... 310/239, 240, 241, 242, 310/244, 245, 246, 247, 248, 249, 238

[56] References Cited

U.S. PATENT DOCUMENTS

| | | | |
|---|---|---|---|
| 2,194,620 | 3/1940 | Sekyra | 310/247 |
| 2,474,601 | 6/1949 | Thomas | 310/247 |
| 2,748,302 | 5/1956 | Boekel | 310/247 |
| 2,948,795 | 8/1960 | Brinster | 310/248 |
| 3,339,098 | 3/1965 | Burrows et al. | 310/239 |

FOREIGN PATENT DOCUMENTS

| | | | |
|---|---|---|---|
| 0560232 | 9/1932 | Fed. Rep. of Germany | 310/245 |
| 451714 | 8/1936 | United Kingdom | 310/249 |
| 530030 | 12/1940 | United Kingdom | 310/239 |
| 0613429 | 6/1978 | U.S.S.R. | 310/240 |
| 0860186 | 8/1981 | U.S.S.R. | 310/239 |

*Primary Examiner*—R. Skudy
*Attorney, Agent, or Firm*—Ronald B. Sherer; Harold Weinstein; Edward D. Murphy

[57] ABSTRACT

A carbon brush assembly comprises a brush box having a slit along one side thereof, and a carbon brush slidably mounted in the brush box with a spring connected between the brush box and the brush to resiliently urge the brush outwardly. An electrically conductive pin is inserted in a transverse bore in the brush and extends through the slit for movement therealong. A brush lead is electrically connected to the pin and a stop associated with the slit adjacent the outer end thereof. The stop forms a closed end of the slit for limiting movement of the pin therealong under the influence of the spring, and so retaining the pin in the slot when said brush wears out. Preferably, the brush is formed with breaking incisions in its sides adjacent the pin to enable the protruding end of the brush to break off and interrupt electrical connection with a commutator when the brush has worn to the end of its useful life.

12 Claims, 4 Drawing Figures

CARBON BRUSH WITH PIN FOR LIMITING MOVEMENT

FIELD OF THE INVENTION

This invention relates to carbon brush assemblies for electric motors wherein a carbon brush is slidably mounted in a brush box and resiliently urged against the commutator of the electric motor.

BACKGROUND OF THE INVENTION

It is well known to locate a spring between the carbon brush and a closed end of the brush box for resiliently urging the carbon brush outwardly through an open end of the brush box into contact with the motor's commutator. It is also known to have a longitudinal slot in a side of the brush box through which slot a flexible braided brush lead extends and can move with the brush relative to the brush box. The flexible brush lead penetrates directly into the brush and is secured therein by a delicate and time consuming manufacturing process.

U.S. Pat. No. 3,339,098 discloses a carbon brush assembly in which a rectangular sectioned brush has formed at its inner end a cylindrical portion over which is fitted an annular, metal connecting element. This connecting element has an extension which extends transversely outwards through a slit along a side wall of the brush box. A flexible brush lead is attached to this extension which is movable along the slit as the brush wears. A coil spring engages over the cylindrical portion of the brush and is compressed between the annular connecting element and a closure cap closing the rear end of the brush box. Shoulders are formed internally of the brush box to limit forward movement of the annular connecting element. The spring functions both to ensure electrical contact between the annular connecting element and the carbon brush, and to press the carbon brush against the commutator.

This arrangement has several disadvantages. The cylindrical portion of the brush has to be produced by a separate manufacturing operation, carbon brushes generally being of rectangular or square cross-section.

Furthermore, it is only possible to assemble the carbon brush, spring and brush lead connecting element in the brush-holder if the slit along the brush-holder remains open at least at one end during assembly; otherwise, it would be impossible to introduce the connecting element into the interior of the brush-holder. It is consequently necessary, after inserting the carbon brush, connecting element and spring into the brush-holder, to close either the rear end of the brush-holder or the front end of the slit provided in the brush-holder; this necessitates an additional assembly operation. Also, the contact pressure which is exerted by the spring upon the connecting element, and whereby the electrical contact between connecting element and carbon brush is maintained, is comparatively weak; this is because the force of the spring is chosen in accordance with the desired contact pressure of the carbon brush against the commutator and is required to be relatively small.

SUMMARY OF THE INVENTION

An object of the invention is to provide a carbon brush assembly in which the distance the carbon brush can be urged out of the brush box is limited and wherein the carbon brush, brush spring and an electrical connection member for the carbon brush can be assembled in the brush box in a simple manner.

A feature by which this object is achieved is the insertion of a pin transversely into the carbon brush with a portion of the pin protruding from the carbon brush through a slot in the brush box, this pin both limiting outward movement of the brush and providing the electrical connection to the brush. This has the advantage that the pin can simply be inserted in the brush after the brush and spring have been assembled in the brush box; it has the further advantage that a brush lead can readily be attached to the protruding pin.

Thus, a brush box may be employed which does not require deforming or modifying after insertion of the carbon brush; that is, the brush box can be prefabricated to its final shape before insertion of the brush.

Accordingly, therefore, there is provided by the present invention a brush assembly comprising a brush box having a slit along one side thereof, a carbon brush slidably mounted in the brush box, a spring connected between the brush box and the brush and acting on one end of the brush to resiliently urge the other end of the brush outwardly from an outer end of the brush box, an electrically conductive pin inserted transversely in the brush in electrical contact therewith and extending through the slit for movement therealong, a brush lead electrically connected to the pin, and a stop associated with the slit adjacent the outer end of the brush box for limiting movement of the pin along the slit under the influence of the spring and so retaining the pin in the slot when the brush wears out.

Preferably, the brush is formed with a transverse bore and the pin plugged therein. Such a bore is extremely simple to produce.

Preferably, the pin is slit, like a split pin, along at least part of its length, this slit part being transversely resilent and being compressed during insertion into the transverse bore. The resulting clamping effect provides a sound and reliable retention of the pin in the transverse bore as well as good electrical connection between the pin and the carbon brush.

Preferably, the brush box has two similar opposed slits, both closed at their forward ends and the pin extending through both. This ensures that the brush is retained aligned in the brush holder even when the brush has been worn to the extent that the pin comes into abutment against the forward closed ends of the slits.

An optional feature of the invention is the provision of a predetermined breaking point in the brush adjacent the transverse bore, preferably by incisions in the sides of the brush parallel to this bore. This enables the brush to break off at this point when only a comparatively short piece of carbon brush remains present between its front end in contact with the commutator and this predetermined breaking point. This has the advantage of positively interrupting electrical connection between the brush and the commutator when the brush has served its useful life.

Other objects, features and advantages of the present invention will become more fully apparent from the following detailed description of the preferred embodiment, the appended claims and the accompanying drawing.

DETAILED DESCRIPTION OF THE PREFERRED EMBODIMENT

Figure 1:
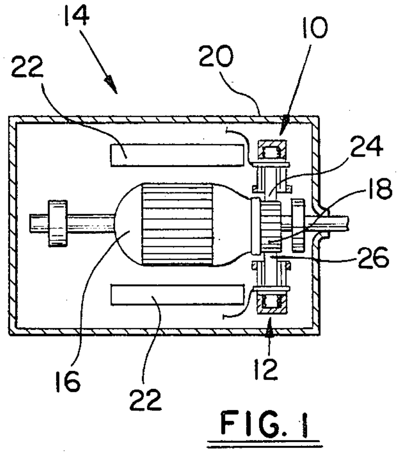
FIG. 1 illustrates diagrammatically a longitudinal section of an electric motor equipped with a pair of carbon brush assemblies according to the invention.

FIG. 1 shows a pair of identical carbon brush assemblies 10, 12 according to the invention mounted in operating position in an electric motor 14 having a rotatable armature 16 with a commutator 18.

Although details of the manner in which the brush assemblies are mounted in the electric motor are not illustrated in FIG. 1, the brush assemblies 10, 12 are supported in a manner well known in the art by the housing 20 and/or the stator assembly 22 of the electric motor, with the brushes 24, 26 of the brush assemblies 10, 12 resiliently urged into both physical and electrical contact with the commutator 18.

Figure 2:
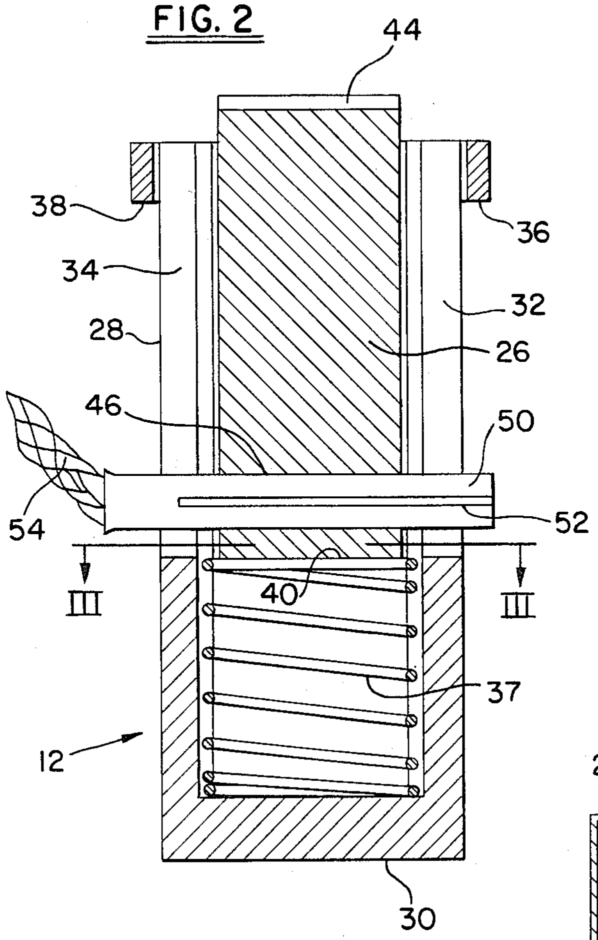
FIG. 2 shows the lower carbon brush assembly of FIG. 1 in greater detail and on a larger scale.
Figure 4:
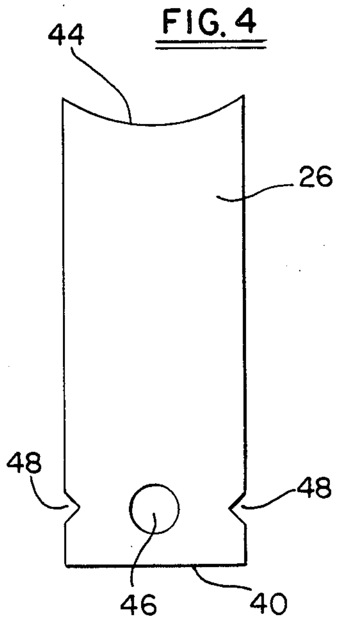
FIG. 4 is a side view of the carbon brush of FIG. 2 taken from either the right or left hand side of FIG. 2.
Figure 3:
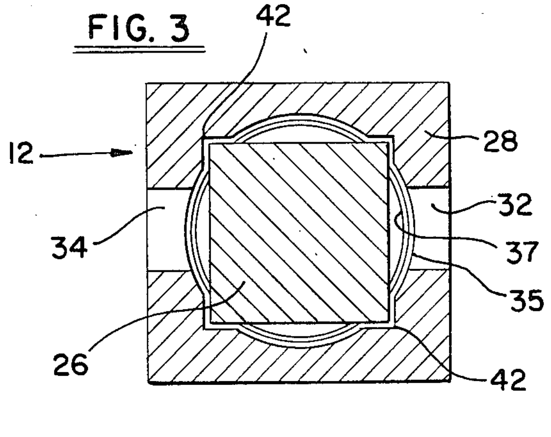
FIG. 3 is a cross-section on the line III—III of FIG. 2.

FIGS. 2, 3 and 4 show in greater detail the lower carbon brush assembly 12 of FIG. 1 and the carbon brush 26 thereof.

This carbon brush assembly includes a brush box or brush-holder 28 consisting of sheet metal or plastic, and having a rear end wall 30 with side walls adjoining the latter. Slits 32 and 34 are present in two opposite side walls, and are bounded at their outer ends (nearest the commutator) by front outwardly disposed end stops 36 and 38. The stops 36, 38 are equally distanced from the front end of the brush box 28 so effectively terminating the slits just short of this front end. The slits 32, 34 are also closed at their other ends intermediate the length of the brush box 28 adjacent the line III—III in FIG. 2. The central cavity or space of the brush box 28 has a cross-sectional shape which consists of a square superimposed on a circle as may be seen particularly from FIG. 3. The circular region 35 of this cross-section serves to accommodate a coil spring 37 which is braced, on the one hand, against the rear end wall 30 of the brush box 28 and, on the other hand, against the rear end surface 40 of the carbon brush 26. The carbon brush 26 has a square cross-section and is arranged to extend into the corner regions 42 formed by the square region of the cross-section of the central cavity of the brush box 28. In this way the spring 37 contacts the rear surface 40 of the carbon brush in the vicinity of these corner regions 42, as can be appreciated from FIG. 3.

The front end 44, projecting out of the brush box 28, of the carbon brush 26 is concavely rounded for adaptation to the cylindrical shape of the commutator (see FIG. 4), and a through transverse bore 46 is located in the rear region of the carbon brush 26 adjacent the spring 38, the bore 46 being perpendicular to the longitudinal direction of movement of the brush 26. At the same distance along the brush 26 as this transverse bore 46, V-shaped incisions 48 are formed in the opposed sides of the brush 26 parallel to the bore 46. These incisions 48 provide a preset breaking location of the brush 26

In order to assemble the carbon brush arrangement, the spring 37 and the carbon brush 26 are inserted through the open front into the brush box 28, and a metal pin 50 of electrically conductive material is then press fitted into the transverse bore 46 so that it extends both through the slit 34 and also through the slit 32 (see FIG. 2). The pin 50 is slit along the major portion of its length by an incision 52 enabling it to be resiliently compressed during insertion into the bore 46. This ensures secure retention of the pin in the bore 46, and also reliable electrical contact between the carbon brush 26 and the pin 50.

A flexible braided lead 54 is secured to the non-slitted end of the pin 50 by pinching, soldering or plugging-in, and via which the electrical connection for the carbon brush 26 to the field windings of the electric motor can be established. The lead 54 can be so attached before, but preferably after, the pin 50 is inserted through the carbon brush. The slotted end of the pin 50 is inserted through the slit 34 first.

During operation the spring 37 presses the carbon brush 26 against the commutator, and the carbon brush wears and is gradually consumed. Due to the contact between the rotating commutator 18 and the carbon brush, and depending upon the direction of rotation of the commutator, the carbon brush is pressed either against the right hand or left hand boundary surfaces (FIG. 3) of the corners 42 of the central cavity of the brush box 28 and supported thereby.

Due to the wear of the carbon brush 26, the pin 50 moves progressively further along the slits 32, 34 towards the front stops 36, 38. When the pin 50 comes into abutment against these stops 36, 38, no further feed movement of the carbon brush 26 by the spring 37 towards the commutator is possible. In this final position of the brush 26, the incisions 48 are located comparatively close to the front end of the brush box 28, that is the top in FIG. 2. The lateral support for the carbon brush 26 against the sides of the central cavity of the bursh box 28 is now located only adjacent the incisions 48, and is such that the carbon brush breaks through at the incisions 48 which form a preset breaking point; the small protruding end of the brush 26 falls off and electrical connection with the commutator is interrupted. This stops the motor and is a positive signal that the brushes need replacing. It should be noted that the pin 50, still held in the closed slots 32, 34 by the stops 36, 38, prevents the spring 37 contacting the commutator.

Although carbon brushes have been referred to throughout, this term is used in a general sense to include motor brushes of any material that function as carbon brushes.

The above described embodiments, of course, are not to be construed as limiting the breadth of the present invention. Modifications, and other alternative constructions, will be apparent which are within the spirit and scope of the invention as defined in the appended claims.

What is claimed is:

1. A carbon brush assembly, comprising:
   - a brush box having a slit along one side thereof;
   - a carbon brush slidably mounted in said brush box;
   - a spring connected between said brush box and said brush, and acting on one end of said brush to resiliently urge the other end of said brush outwardly from an outer end of said brush box;
   - an electrically conductive pin inserted transversely in said brush in electrical contact therewith and extending through said slit for movement therealong;
   - a brush lead electrically connected to said pin;
   - a stop associated with said slit adjacent said outer end for limiting movement of said pin along said slit under the influence of said spring and so retaining said pin in said slit when said brush wears out;
part of said pin being elastically deformable transversely to the longitudinal extent of said pin, and said brush having a transverse bore therein which deforms said part whereby said pin is retained in said bore; and
said pin having a longitudinal incision extending from one end thereof, and said brush lead being connected to the other end thereof.

2. The carbon brush assembly of claim 1, wherein said slit is parallel to said brush, and said spring comprises a coil spring compressed between said brush and a closed end of said brush box.

3. The carbon brush assembly of claim 1, further comprising a second slit along a side of said brush box opposite said one side, a second stop adjacent said outer end and associated with said second slit, and wherein said pin also extends through said second slit for movement therealong.

4. The carbon brush assembly of claim 1, wherein said carbon brush assembly is mounted in an electric motor with said other end of said brush urged into contact with a commutator of an armature of the motor.

5. A carbon brush assembly, comprising:
a brush box having a slit along one side thereof;
a carbon brush slidably mounted in said brush box and resiliently urged outwardly of an outer end of said brush box;
an electrically conductive pin inserted transversely in said brush in electrical contact therewith and extending through said slit for movement therealong;
a brush lead electrically connected to said pin;
a stop associated with said slit for limiting movement of said pin along said slit as said brush is resiliently urged outwardly to retain said pin in said slit when said brush wears out; and
sides of said brush being formed with incisions to provide a predetermined breaking point at a location adjacent said pin.

6. A carbon brush assembly, comprising:
a brush box having a slit along one side thereof;
a carbon brush slidably mounted in said brush box;
a spring connected between said brush box and said brush, and acting on one end of said brush to resiliently urge the other end of said brush outwardly from an outer end of said brush box;
an electrically conductive pin inserted transversely in said brush in electrical contact therewith and extending through said slit for movement therealong;
a brush lead electrically connected to said pin;
a stop associated with said slit adjacent said outer end for limiting movement of said pin along said slit under the influence of said spring and so retaining said pin in said slit when said brush wears out;
said brush being formed with a predetermined breaking point at a location adjacent said pin; and
said breaking point being formed by incisions in opposite sides of said brush parallel to said pin.

7. A carbon brush assembly, comprising:
a brush box having a forward end open and a rear end closed, and having two parallel slits along opposed sides thereof;
a carbon brush slidably mounted in said brush box for movement therein parallel to said slits;
a spring acting between said closed end and one end of said brush for resiliently urging the other end of said brush outwardly through said forward end;
a metal pin slit along at least part of its length, the slit part of its length being transversely resilient;
said metal pin being plugged into a transverse bore through said brush adjacent said one end with said slit part being compressed by said bore, said pin extending through said two slits and being movable therealong;
a flexible brush lead connected to said pin; and
means, adjacent said forward end, for limiting movement of said pin along said slits under the influence of said spring to retain said pin in said slits when said brush has worn out.

8. A carbon brush assembly, comprising:
a brush box having a forward end open and a rear end closed, and having two parallel slits along opposed sides thereof;
a carbon brush slidably mounted in said brush box for movement therein parallel to said slits;
a spring acting between said closed end and one end of said brush for resiliently urging the other end of said brush outwardly through said forward end;
a metal pin plugged into a transverse bore through said brush adjacent said one end, said pin extending through said two slits and being movable therealong;
a flexible brush lead connected to said pin;
means, adjacent said forward end, for limiting movement of said pin along said slits under the influence of said spring to retain said pin in said slits when said brush has worn out; and
said brush having breaking incisions in opposite sides thereof at a location adjacent said bore to enable said other end of said brush to break off at said location when said brush was worn to the extent that said limiting means prevents further movement of said pin.

9. The carbon brush assembly of claim 8, wherein said limiting means comprises stops at forward ends of said slits, said pin is slit along at least part of its length to enable it to be compressed by said bore, and said incisions are parallel to said bore.

10. In an electric motor having a commutator, a carbon brush assembly comprising:
a brush box having a closed slit along one side thereof;
a carbon brush slidably mounted in said brush box and resiliently urged through an open end thereof into contact with said commutator;
an electrically conductive pin having a brush lead connected thereto, said pin being inserted transversely in said brush and extending through said slit for movement therealong, said closed slit limiting such movement of said pin and retaining said pin in said slit when said brush has worn out; and
V-shaped incisions formed transversely in sides of said brush at a location adjacent said pin for enabling a portion of said brush adjacent and in contact with said commutator to break off at said location when said brush has worn out, so interrupting electrical connection between said brush and said commutator.

11. In an electric motor having a commutator, a carbon brush assembly comprising:
a brush box having a closed slit along one side thereof;
a carbon brush slidably mounted in said brush box and resiliently urged through an open end thereof into contact with said commutator;

an electrically conductive pin having a brush lead connected thereto, said pin being inserted transversely in said brush and extending through said slit for movement therealong, said closed slit limiting such movement of said pin and retaining said pin in said slit when said brush has worn out;

means, formed in said brush at a location adjacent said pin, for enabling a portion of said brush adjacent and in contact with said commutator to break off at said location when said brush has worn out, so interrupting electrical connection between said brush and said commutator; and said means comprising incisions parallel to said pin and in opposite sides of said brush.

12. The carbon brush assembly of claim 11, wherein said brush has a bore transversely therethrough, and said pin is split whereby said pin is compressed in said bore to secure said pin therein and make electrical contact with said brush.

* * * * *